United States Patent
Hodzic et al.

(10) Patent No.: US 8,620,555 B2
(45) Date of Patent: Dec. 31, 2013

(54) WHEEL SLIP DETERMINATION FOR VEHICLES

(75) Inventors: Mahir Hodzic, Sterling Heights, MI (US); Eric J. Holdorf, Warren, MI (US); Eric E. Krueger, Chelsea, MI (US); Kevin S. Kidston, New Hudson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1066 days.

(21) Appl. No.: 12/627,599

(22) Filed: Nov. 30, 2009

(65) Prior Publication Data

US 2011/0127097 A1 Jun. 2, 2011

(51) Int. Cl.
*B60T 8/32* (2006.01)
*B60T 7/12* (2006.01)
*B60K 28/16* (2006.01)

(52) U.S. Cl.
USPC .......... 701/74; 701/82; 701/90; 180/197

(58) Field of Classification Search
USPC .............. 180/197; 701/74, 75, 82, 83, 90
See application file for complete search history.

(56) References Cited

U.S. PATENT DOCUMENTS

| 3,743,900 | A | * | 7/1973 | Johansson | 318/52 |
| 4,924,394 | A | * | 5/1990 | Uchida et al. | 701/75 |
| 5,019,984 | A | * | 5/1991 | Masaki et al. | 701/75 |
| 5,404,302 | A | * | 4/1995 | Matsuda et al. | 701/71 |
| 6,023,650 | A | * | 2/2000 | Yamamoto et al. | 701/82 |
| 6,253,602 | B1 | | 7/2001 | Uchida | |
| 6,324,461 | B1 | * | 11/2001 | Yamaguchi et al. | 701/80 |
| 6,385,526 | B1 | * | 5/2002 | Krueger | 701/84 |
| 7,451,847 | B2 | * | 11/2008 | Hommi | 180/197 |
| 7,957,880 | B2 | * | 6/2011 | Watabe et al. | 701/90 |
| 2003/0151302 | A1 | * | 8/2003 | Anwar | 303/112 |

FOREIGN PATENT DOCUMENTS

DE 4108948 A1 9/1992

* cited by examiner

*Primary Examiner* — Paul N Dickson
*Assistant Examiner* — Daniel Yeagley
(74) *Attorney, Agent, or Firm* — Ingrassia Fisher & Lorenz, P.C.

(57) ABSTRACT

A method for assessing slippage of wheels in a vehicle includes the steps of measuring, via a sensor, an initial value of vehicle speed, determining, via a processor, at least one of a minimum vehicle speed and a maximum vehicle speed, and determining, via the processor, wheel slip using the initial value and the at least one of the minimum vehicle speed and the maximum vehicle speed.

20 Claims, 3 Drawing Sheets

WHEEL SLIP DETERMINATION FOR VEHICLES

TECHNICAL FIELD

The present invention generally relates to the field of vehicles and, more specifically, to methods and systems for determining wheel slip for vehicles.

BACKGROUND OF THE INVENTION

Automobiles and various other vehicles include various control units for controlling various aspects of the vehicle operation. For example, vehicles generally include a braking system for controlling braking for the vehicle. The operation of such vehicle control systems may depend on, among other variables, a wheel slip of the vehicle. However, calculation of wheel slip using existing techniques often requires a larger number of wheel speed sensors that may be optimal for certain vehicle aspects, such as fuel economy and/or complying with new state regulations pertaining to fuel economy.

Accordingly, it is desirable to provide an improved method for determining wheel slip of a vehicle, for example that requires fewer wheel speed sensors. It is also desirable to provide an improved system for determining wheel slip of a vehicle, for example that requires fewer wheel speed sensors. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for assessing slippage of wheels in a vehicle is provided. The method comprises the steps of measuring, via a sensor, an initial value of vehicle speed, determining, via a processor, at least one of a minimum vehicle speed and a maximum vehicle speed, and determining, via the processor, wheel slip using the initial value and the at least one of the minimum vehicle speed and the maximum vehicle speed.

In accordance with another exemplary embodiment of the present invention, a method for assessing slippage of wheels in a vehicle is provided. The method comprises the steps of measuring, via a transmission output shaft speed sensor, an average wheel driven speed of the vehicle, determining, via a processor, a minimum vehicle speed and a maximum vehicle speed, calculating, via the processor, a bounded vehicle speed using the average wheel driven speed, the minimum vehicle speed, and the maximum vehicle speed, and calculating, via the processor, wheel slip using the average wheel driven speed and the bounded vehicle speed.

In accordance with a further exemplary embodiment of the present invention, a system for assessing slippage of wheels in a vehicle is provided. The system comprises a transmission output shaft speed sensor and a processor. The transmission output shaft speed sensor is configured to measure an average wheel driven speed of the vehicle. The processor is coupled to the transmission output shaft speed sensor, and is configured to calculate a minimum vehicle speed and a maximum vehicle speed, calculate a bounded vehicle speed using the average wheel driven speed, the minimum vehicle speed, and the maximum vehicle speed, and determine wheel slip using the average wheel driven speed and the bounded vehicle speed.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
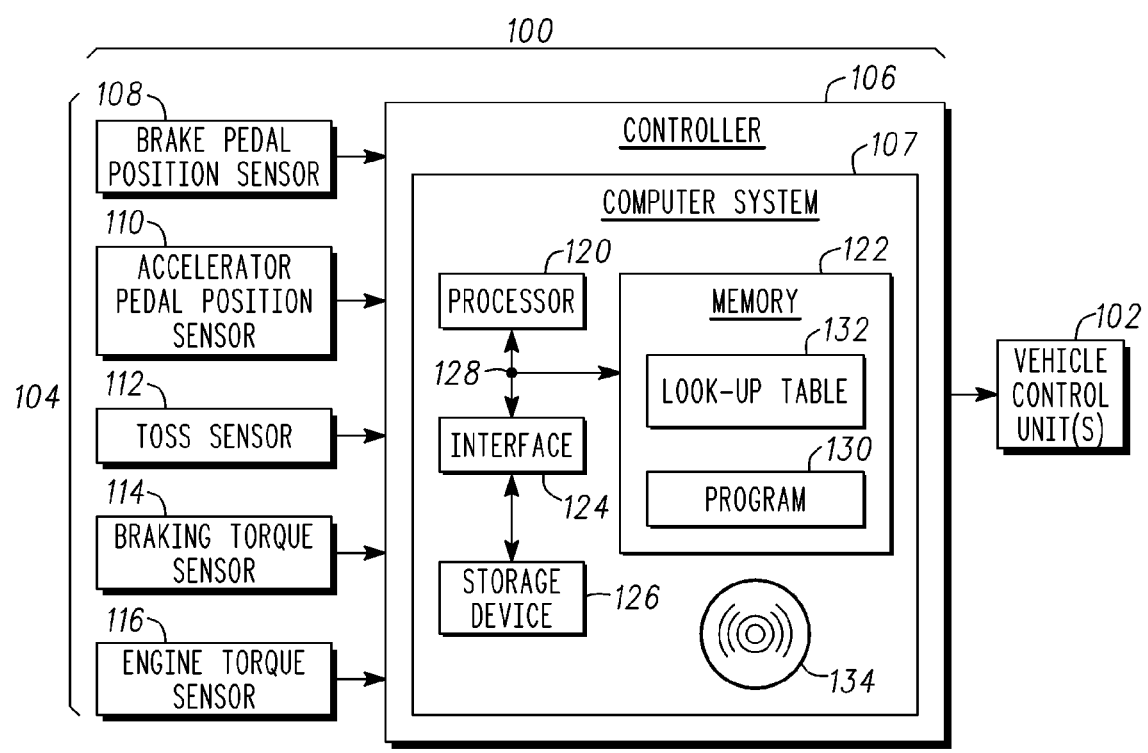
FIG. 1 is a functional block diagram of a control system for a vehicle control unit that is configured to determine wheel slippage and control one or more functions for a vehicle, such as an automobile, in accordance with an exemplary embodiment of the present invention.

FIG. 1 is a block diagram of an exemplary control system 100 for use in a vehicle control unit 102 of a vehicle. In a preferred embodiment, the vehicle comprises an automobile, such as a sedan, a sport utility vehicle, a van, or a truck. However, the type of vehicle may vary in different embodiments of the present invention. In certain exemplary embodiments, the vehicle control unit 102 comprises a braking unit for the vehicle. In various other exemplary embodiments, the vehicle control unit 102 comprises one or more other units of the vehicle.

As depicted in FIG. 1, the control system 100 includes a plurality of sensors 104 and a controller 106. The sensors 104 include one or more brake pedal position sensors 108, accelerator pedal position sensors 110, transmission output shaft speed sensor (TOSS) 112, braking torque sensors 114, and/or engine torque sensors 116. The measurements and/or information from the sensors 104 are provided to the controller 106 for processing and for determination of wheel slip for the vehicle and for ultimate use in controlling one or more vehicle functions, such as vehicle braking.

The brake pedal position sensor 108 provides an indication of a position of a brake pedal of the vehicle or an indication as to how far the brake pedal has traveled when the operator applies force to the brake pedal. In one exemplary embodiment, the brake pedal position sensor 108 measures a position of the brake pedal and provides information pertaining thereto to the processor 120 for processing and for use in calculating a lower vehicle speed bound or minimum speed of the vehicle, and for subsequent use in determining wheel slip for the vehicle. In another exemplary embodiment, the brake pedal position sensor 108 measures information pertaining to the brake pedal and provides this information to the processor 120 for processing and for use in calculating the brake pedal position as well as use in calculating a lower vehicle speed bound or minimum speed of the vehicle, and for subsequent use in determining wheel slip for the vehicle.

The accelerator pedal position sensor 110 provides an indication of a position of an accelerator pedal of the vehicle or an indication as to how far the accelerator pedal has traveled when the operator applies force to the accelerator pedal. In one exemplary embodiment, the accelerator pedal position sensor 110 measures a position of the accelerator pedal and provides information pertaining thereto to the processor 120 for processing and for use in calculating an upper vehicle speed bound or maximum speed of the vehicle, and for subsequent use in determining wheel slip for the vehicle. In another exemplary embodiment, the accelerator pedal position sensor 110 measures information pertaining to the accelerator pedal and provides this information to the processor 120 for processing and for use in calculating the accelerator pedal position as well as use in calculating an upper vehicle speed bound or maximum speed of the vehicle, and for subsequent use in determining wheel slip for the vehicle.

The TOSS sensor 112 provides an indication of an average wheel driven speed for the vehicle. In one exemplary embodiment, the TOSS sensor 112 measures one or more values of average wheel driven speed and provides information pertaining thereto to the processor 120 for processing and for use in determining wheel slip for the vehicle. In another exemplary embodiment, the TOSS sensor 112 measures information pertaining to the wheels and provides this information to the processor 120 for processing and for use in calculating the average wheel driven speed as well as for use in determining wheel slip for the vehicle.

The braking torque sensor 114 provides an indication of a magnitude of braking torque for a braking unit of the vehicle or information pertaining thereto. In one exemplary embodiment, the braking torque sensor 114 measures a magnitude of braking torque for a braking unit of the vehicle and provides information pertaining thereto (for example, instead of or in addition to the brake pedal position information provided by the brake pedal position sensor 108 described above) to the processor 120 for processing and for use in calculating a lower vehicle speed bound or minimum speed of the vehicle, and for subsequent use in determining wheel slip for the vehicle. In another exemplary embodiment, the braking torque sensor 114 measures information pertaining to the magnitude of braking torque for a braking unit of the vehicle and provides this information (for example, instead of or in addition to the brake pedal position information provided by the brake pedal position sensor 108 described above) to the processor 120 processing and for use in calculating the magnitude of braking torque for a braking unit of the vehicle as well as use in calculating a lower vehicle speed bound or minimum speed of the vehicle, and for subsequent use in determining wheel slip for the vehicle.

The engine torque sensor 116 provides an indication of a magnitude of torque for an engine of the vehicle or information pertaining thereto. In one exemplary embodiment, the engine torque sensor 116 measures a magnitude of torque for an engine of the vehicle and provides information pertaining thereto to the processor 120 (for example, instead of or in addition to the accelerator pedal position information provided by the accelerator pedal position sensor 110 described above) for processing and for use in calculating an upper vehicle speed bound or maximum speed of the vehicle, and for subsequent use in determining wheel slip for the vehicle. In another exemplary embodiment, the engine torque sensor 116 measures information pertaining to the magnitude of torque for an engine of the vehicle and provides this information to the processor 120 (for example, instead of or in addition to the accelerator pedal position information provided by the accelerator pedal position sensor 110 described above) for processing and for use in calculating the accelerator pedal position as well as use in calculating an upper vehicle speed bound or maximum speed of the vehicle, and for subsequent use in determining wheel slip for the vehicle.

The controller 106 is coupled between the sensors 104 and the vehicle control units 102. As depicted in FIG. 1, the controller 106 preferably includes a computer system 107. The controller 106 (and preferably a processor 120 of the computer system 107 thereof) processes the information provided by various combinations of the sensors 104 of FIG. 1 and determines a wheel slip of the vehicle using this information. The controller 106 (and preferably a processor 120 of the computer system 107 thereof) preferably provides the wheel slip determination to the vehicle control unit 102 for use in one or more aspects of vehicle control.

For example, in one exemplary embodiment, the controller 106 (and preferably a processor 120 of the computer system 107 thereof) provides the wheel slip determination to a braking system 102 for use by the braking system 102 in controlling and/or adjusting braking for the vehicle. In another exemplary embodiment, the controller 106 (and preferably a processor 120 of the computer system 107 thereof) determines instructions for a braking system 102 based on the wheel slip determinations and provides these instructions to the braking system 102 for controlling and/or adjusting braking for the vehicle.

It will similarly be appreciated that the controller 106 may utilize the wheel slip determination in various different manners in connection with one or more other different vehicle control units 102 and/or in implementing control and/or adjustment of one or more other different functions pertaining to operation of the vehicle.

In the depicted embodiment, the controller 106 comprises a computer system 107. In certain embodiments, the controller 106 may also include one or more of the sensors 104, among other possible variations. In addition, it will be appreciated that the controller 106 may otherwise differ from the embodiment depicted in FIG. 1, for example in that the controller 106 may be coupled to or may otherwise utilize one or more remote computer systems and/or other control systems.

In the depicted embodiment, the computer system 107 is coupled between the sensors 104 and the vehicle control units 102. The computer system 107 receives signals or information pertaining to various measurements relating to the sensors 104 (such as brake pedal position, accelerator pedal position, average wheel driven speed, braking torque, and/or engine torque). The computer system 107 further processes these signals or information in order to calculate the wheel slip for the vehicle and, in some embodiments, for controlling or adjusting one or vehicle functions pertaining to operation of the vehicle. In a preferred embodiment, these and other steps are conducted in accordance with the process 200 depicted in FIGS. 2-5 and described further below in connection therewith.

In the depicted embodiment, the computer system 107 includes a processor 120, a memory 122, an interface 124, a storage device 126, and a bus 128. The processor 120 performs the computation and control functions of the computer system 107 and the controller 106, and may comprise any type of processor or multiple processors, single integrated circuits such as a microprocessor, or any suitable number of integrated circuit devices and/or circuit boards working in cooperation to accomplish the functions of a processing unit. During operation, the processor 120 executes one or more programs 130 contained within the memory 122 and, as such, controls the general operation of the controller 106 and the computer system 107, preferably in executing the steps of the processes described herein, such as the process 200 depicted in FIGS. 2-5 and described further below in connection therewith.

The memory 122 can be any type of suitable memory. This would include the various types of dynamic random access memory (DRAM) such as SDRAM, the various types of static RAM (SRAM), and the various types of non-volatile memory (PROM, EPROM, and flash). The bus 128 serves to transmit programs, data, status and other information or signals between the various components of the computer system 107. In a preferred embodiment, the memory 122 stores the above-referenced program 130 along with one or more look-up tables 132 that are used in calculating wheel slip and/or controlling vehicle functions, in accordance with steps of the process 200 depicted in FIGS. 2-5 and described further below in connection therewith.

The interface 124 allows communication to the computer system 107, for example from a system driver and/or another computer system, and can be implemented using any suitable method and apparatus. It can include one or more network interfaces to communicate with other systems or components. The interface 124 may also include one or more network interfaces to communicate with technicians, and/or one or more storage interfaces to connect to storage apparatuses, such as the storage device 126.

The storage device 126 can be any suitable type of storage apparatus, including direct access storage devices such as hard disk drives, flash systems, floppy disk drives and optical disk drives. In one exemplary embodiment, the storage device 126 comprises a program product from which memory 122 can receive a program 130 that executes one or more embodiments of one or more processes of the present invention, such as the process 200 of FIGS. 2-5 or portions thereof. In another exemplary embodiment, the program product may be directly stored in and/or otherwise accessed by the memory 122 and/or a disk (e.g., disk 134) such as that referenced below.

The bus 128 can be any suitable physical or logical means of connecting computer systems and components. This includes, but is not limited to, direct hard-wired connections, fiber optics, infrared and wireless bus technologies. During operation, the program 130 is stored in the memory 122 and executed by the processor 120.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 107 may also otherwise differ from the embodiment depicted in FIG. 1, for example in that the computer system 107 may be coupled to or may otherwise utilize one or more remote computer systems and/or other control systems.

Figure 2:
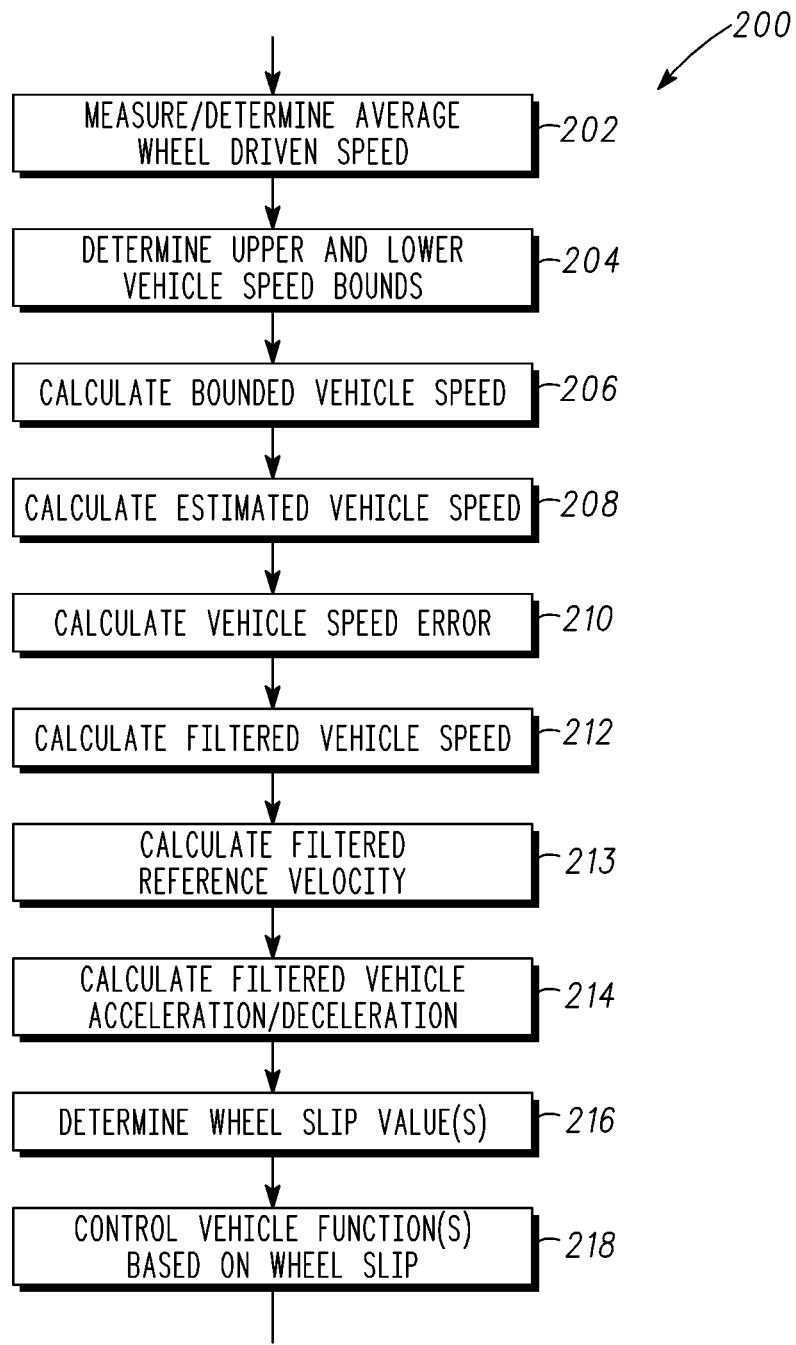
FIG. 2 is a flowchart of a process for determining wheel slippage and controlling one or more functions for a vehicle, such as an automobile, and that can be utilized in connection with the control system of FIG. 1, in accordance with an exemplary embodiment of the present invention.

FIG. 2 is a flowchart of a process 200 for determining wheel slippage and controlling functions for a vehicle, in accordance with an exemplary embodiment of the present invention. The process 200 can be implemented in connection with the control system 100 of FIG. 1, the controller 106, and/or the computer system 107 of FIG. 1, in accordance with an exemplary embodiment of the present invention.

As depicted in FIG. 2, the process 200 begins with the step of measuring an average wheel driven speed of the vehicle (step 202). In one exemplary embodiment, the average wheel driven speed is measured by the TOSS sensor 112 of FIG. 1 or by a separate TOSS system. In another exemplary embodiment, the average wheel driven speed is calculated by the processor 120 of FIG. 1 using signals or information provided by the TOSS sensor 112 of FIG. 1.

Figure 3:
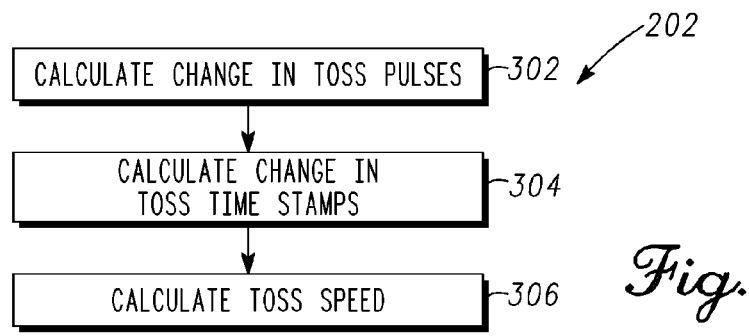
FIG. 3 is a flowchart of a sub-process for a step in the process of FIG. 2, namely the step of determining an average wheel driven speed for the vehicle, such as an automobile, and that can be utilized in connection with the control system of FIG. 1, in accordance with an exemplary embodiment of the present invention.

With reference to FIG. 3, an exemplary embodiment is provided for determining the average wheel driven speed of step 202. In the embodiment depicted in FIG. 3, the average wheel driven speed is calculated by the processor 120 of FIG. 1 based on the output of the TOSS sensor 112 of FIG. 1, which preferably consists of a TOSS pulse counter and TOSS time stamps. In a preferred embodiment, the average wheel driven speed is calculated in three steps, as described below.

First, a change in TOSS pulses is calculated across iterations (step 302). During each iteration or loop, the change in pulses read by the TOSS sensor is calculated by subtracting the current pulse value from the previous loop's pulse value. In certain embodiments, the TOSS pulse counter will overflow if its pulse counts exceed a predetermined count, such as 1023 in one exemplary embodiment. However, the thresholds or criteria may vary in other embodiments. In the event of an overflow, the calculation may be adjusted to account for the overflow.

Next, the change in time stamps from the TOSS sensor is calculated using similar logic (step 304). During each iteration or loop the change in time stamps is preferably calculated by subtracting the current time stamp value from the previous loop's time stamp value. In certain embodiments, the timestamp counter will also overflow if its output exceeds a predetermined count, such as 65535 in one exemplary embodiment. However, the thresholds or criteria may vary in other embodiments. In the event of an overflow, the calculation may be adjusted to account for the overflow.

Next, the TOSS speed is preferably calculated during every loop or iteration by dividing Delta TOSS Pulse Counter by Delta TOSS Time Stamp (step 306). When the Delta TOSS Time Stamp is zero, the TOSS speed is calculated by subtracting the minimum (more negative) of the last deceleration value and a calibration from the last acceptable value of TOSS speed. This continues until TOSS speed equals zero or the Delta TOSS Time Stamp value is non-zero. The TOSS speed is then used as the average wheel driven speed for the vehicle for step 202.

Returning now to FIG. 2, an upper vehicle speed bound and a lower vehicle speed bound are determined (step 204). In a preferred embodiment, the lower vehicle speed bound comprises a minimum vehicle speed that the vehicle is capable of obtaining during operation under current conditions. Specifically, in a most preferred embodiment, the lower vehicle speed bound, or minimum vehicle speed, as referenced throughout, represents a forward-looking estimate of the minimum speed that the vehicle is believed to be able to obtain during an iteration of the process 200 after taking into account all inputs and data of the control loop, using all available data and information.

Also in a preferred embodiment, the upper vehicle speed bound comprises a maximum vehicle speed that the vehicle is capable of obtaining during operation under current conditions. Specifically, in a most preferred embodiment, the upper vehicle speed bound, or maximum vehicle speed, as referenced throughout, represents a forward-looking estimate of the maximum speed that the vehicle is believed to be able to obtain during an iteration of the process 200 after taking into account all inputs and data of the control loop, using all available data and information. In addition, also in a preferred embodiment, the lower and upper vehicle speed bounds are calculated by the processor 120 of FIG. 1.

In one preferred embodiment, the upper bound (also referenced herein as an unfiltered vehicle speed upper bound) and lower bound (also referenced herein as an unfiltered vehicle speed lower bound) are computed based on the following equations:

Unfiltered Vehicle Speed Upper Bound=Bounded Unfiltered Vehicle Speed (n−1)+(Vehicle Acceleration*Loop Time)    (Equation 1), and Unfiltered Vehicle Speed Lower Bound=Bounded Unfiltered Vehicle Speed (n−1)+(Vehicle Deceleration*Loop Time)    (Equation 2), in which Vehicle Acceleration and Vehicle Deceleration represent expected vehicle acceleration and deceleration rates (preferably based on brake pedal and/or accelerator pedal position and/or torque values), respectively, retrieved from the memory 122 of FIG. 1 and reflecting value based on a prior iteration of step 214 (described further below), and Loop Time represents an amount of time that has elapsed since the prior iteration. As referenced herein with respect to various variables and parameters, the term (n−1) refers to a prior iteration of the loop of one or more steps of the process 200 and to respective variable or parameter values from such prior iteration.

Figure 4:
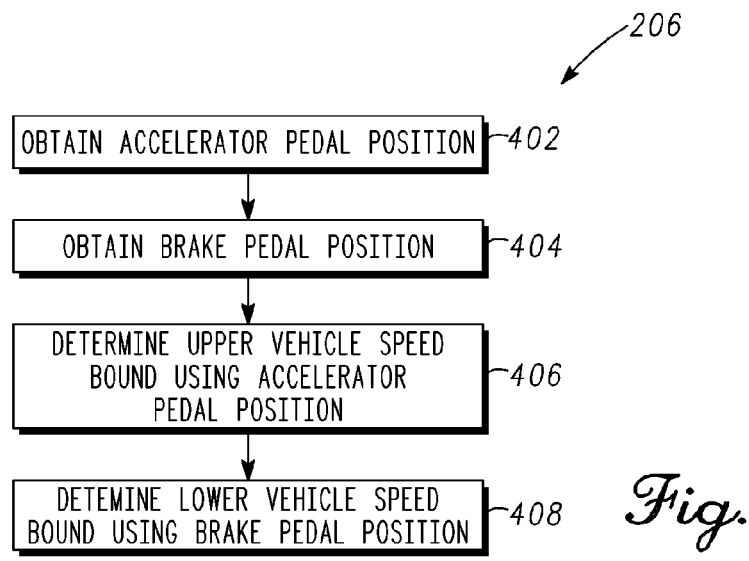
FIG. 4 is a flowchart of a first sub-process for a step in the process of FIG. 2, namely the step of determining upper and lower vehicle speed bounds for a vehicle, such as an automobile, and that can be utilized in connection with the control system of FIG. 1, in accordance with an exemplary embodiment of the present invention.

With reference to FIG. 4, a first exemplary embodiment is provided for determining the upper vehicle speed bound and the lower vehicle speed bound of step 204. In the embodiment depicted in FIG. 4, an accelerator pedal position is obtained (step 402). In one exemplary embodiment, the accelerator pedal position is measured by the accelerator pedal position sensor 110 of FIG. 1 and provided to the processor 120 of FIG. 1. In another exemplary embodiment, the accelerator pedal position is calculated by the processor 120 of FIG. 1 using signals or information provided by the accelerator pedal position sensor 110 of FIG. 1 to the processor 120 of FIG. 1. In various other embodiments, related measures may be utilized, such as an axle torque or a driver intended engine torque that may also be obtained via one or more other sensors and/or devices.

Also as depicted in FIG. 4, a brake pedal position is obtained (step 402). In one exemplary embodiment, the brake pedal position is measured by the brake pedal position sensor 108 of FIG. 1 and provided to the processor 120 of FIG. 1. In another exemplary embodiment, the brake pedal position is calculated by the processor 120 of FIG. 1 using signals or information provided by the brake pedal position sensor 108 of FIG. 1 to the processor 120 of FIG. 1. In various other embodiments, related measures may be utilized, such as a driver intended braking torque that may be obtained via the brake pedal position sensor 108 and/or one or more other sensors and/or devices.

Next, the upper vehicle speed bound (or maximum vehicle speed) is determined using the accelerator pedal position (step 406). In a preferred embodiment, the upper vehicle speed bound (or maximum vehicle speed) is determined in this manner by the processor 120 of FIG. 1.

In addition, the lower vehicle speed bound (or minimum vehicle speed) is determined using the brake pedal position (step 408). In a preferred embodiment, the lower vehicle speed bound (or minimum vehicle speed) is determined in this manner by the processor 120 of FIG. 1.

Figure 5:
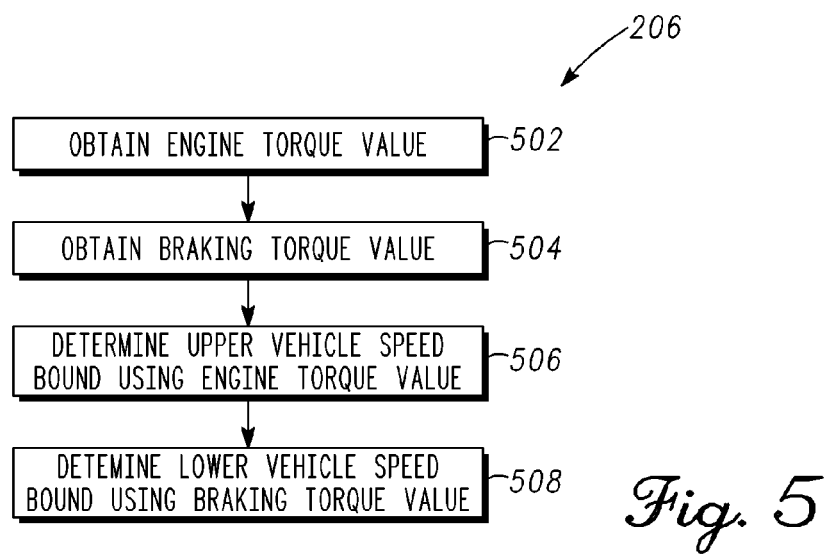
FIG. 5 is a flowchart of a second, alternative, sub-process for a step in the process of FIG. 2, namely the step of determining upper and lower vehicle speed bounds for a vehicle, such as an automobile, and that can be utilized in connection with the control system of FIG. 1, in accordance with an exemplary embodiment of the present invention.

Turning now to FIG. 5, a second exemplary embodiment is provided for determining the upper vehicle speed bound and the lower vehicle speed bound of step 204. In the embodiment depicted in FIG. 5, an engine torque value is obtained (step 502). In one exemplary embodiment, the engine torque value is measured by the engine torque sensor 116 of FIG. 1 and provided to the processor 120 of FIG. 1. In another exemplary embodiment, the engine torque value is calculated by the processor 120 of FIG. 1 using signals or information provided by the engine torque sensor 116 of FIG. 1 to the processor 120 of FIG. 1. In various other embodiments, look-up tables and other related measures (for example, fuel use and/or other measures) may be utilized as a proxy for engine torque.

Also as depicted in FIG. 5, a braking torque value is obtained (step 504). In one exemplary embodiment, the braking torque value is measured by the braking torque sensor 114 of FIG. 1 and provided to the processor 120 of FIG. 1. In another exemplary embodiment, the braking torque value is calculated by the processor 120 of FIG. 1 using signals or information provided by the braking torque sensor 114 of FIG. 1 to the processor 120 of FIG. 1. In various other embodiments, look-up tables and other related measures (for example, brake pedal travel, brake pedal force, and/or other measures) may be utilized as a proxy for braking torque.

Next, the upper vehicle speed bound (or maximum vehicle speed) is determined using the engine torque value (step 506). In a preferred embodiment, the upper vehicle speed bound (or maximum vehicle speed) is determined in this manner by the processor 120 of FIG. 1.

In addition, the lower vehicle speed bound (or minimum vehicle speed) is determined using the braking torque value (step 508). In a preferred embodiment, the lower vehicle speed bound (or minimum vehicle speed) is determined in this manner by the processor 120 of FIG. 1.

Returning now to FIG. 2, a bounded vehicle speed is calculated (step 206). In a preferred embodiment, the bounded vehicle speed is calculated in step 206 by the processor 120 of FIG. 1 using the average wheel driven speed of step 202 and the upper and lower vehicle speed bounds of step 204. Specifically, in one preferred embodiment, the average wheel driven speed can exhibit accelerations and decelerations beyond what the vehicle is physically capable of doing, for example because the individual wheels can accelerate or decelerate at a much higher rate than the vehicle. To protect against these issues the average wheel driven speed is bounded based on a filtered estimate of the vehicle acceleration or deceleration from a prior iteration of step 214 (described further below) in one preferred embodiment.

In addition, an estimated vehicle speed is calculated (step 208). In a preferred embodiment, the estimated vehicle speed is calculated in step 208 by the processor 120 of FIG. 1 using the filtered vehicle speed of a most recent prior iteration of step 212 (described further below) and the filtered vehicle acceleration estimate of a most recent prior iteration of step 214 (also described further below).

In a preferred embodiment, during initialization in a first iteration of step 208, the bounded unfiltered vehicle speed is set equal to the average wheel driven speed for a calibratable length of time. After this calibratable length of time the bounded unfiltered vehicle speed is preferably computed based on the following equation.

Bounded Unfiltered Vehicle Speed=MAX((MIN(Unfiltered Vehicle Speed Upper Bound, Average Wheel Driven Speed)),(Unfiltered Vehicle Speed Lower Bound))    (Equation 3).

Next, a vehicle speed error is calculated (step 210). In a preferred embodiment, the vehicle speed error is calculated in step 210 by the processor 120 of FIG. 1 using the bounded vehicle speed of step 208 and the estimated vehicle speed of step 208, most preferably by subtracting the bounded vehicle speed of step 208 from the estimated vehicle speed of step 208, or vice versa.

A filtered vehicle speed is then calculated (step 212). In a preferred embodiment, the filtered vehicle speed is calculated in step 212 by the processor 120 of FIG. 1 using the bounded vehicle speed of step 208 and the vehicle speed error of step 210.

Specifically, in one preferred embodiment, the bounded vehicle speed of step 208 is filtered in step 212 by determining the estimated change in vehicle reference velocity (also referred to herein as the estimated change in vehicle speed), the estimated reference velocity (also referred to herein as the estimated vehicle speed), and the error in the estimated vehicle reference velocity (also referenced herein as the vehicle speed error). In a preferred embodiment, these signals are calculated in accordance with the following equations:

Estimated Change in Vehicle Speed=Filtered Vehicle Acceleration($n$−1)*Loop Time    (Equation 4), Estimated Vehicle Speed=Filtered Vehicle Speed+ Estimated Change in Vehicle Speed    (Equation 5), and Vehicle Speed Error=Bounded Unfiltered Vehicle Speed−Estimated Vehicle Speed    (Equation 6)

In addition, in a preferred embodiment, a filtered reference velocity is also calculated (step 213). In a preferred embodiment, the filtered reference velocity is calculated in step 213 by the processor 120 of FIG. 1 using the filtered vehicle speed of step 212, in accordance with the following equation:

Filtered Vehicle Speed=Estimated Vehicle Speed+ (Vehicle Speed Error*Vehicle Speed Filter Coefficient)    (Equation 7)

Next, a filtered vehicle acceleration and/or deceleration are calculated (step 214). In a preferred embodiment, the filtered vehicle acceleration and/or filtered deceleration is calculated in step 214 by the processor 120 of FIG. 1.

Specifically, in one preferred embodiment, the estimate of vehicle deceleration is calculated in step 214 by the processor 120 of FIG. 1 from the brake pedal position signal (preferably obtained by the processor 120 of FIG. 1 from the brake pedal position sensor 108 of FIG. 1) or a braking torque sensor signal (preferably obtained by the processor 120 of FIG. 1 from the braking torque sensor 114 of FIG. 1), which is preferably converted to a maximum vehicle deceleration by a lookup table (preferably a look-up table 132 stored in the memory 122 of FIG. 1).

Similarly, an estimate of vehicle acceleration is preferably calculated from an accelerator pedal position signal (preferably obtained by the processor 120 of FIG. 1 from the accelerator pedal position sensor 110 of FIG. 1) or from a calculated axle torque signal (preferably obtained by the processor 120 of FIG. 1 from the engine torque sensor 116 of FIG. 1), which is preferably converted to a maximum vehicle acceleration by a lookup table (preferably a look-up table 132 stored in the memory 122 of FIG. 1).

In addition, also in a preferred embodiment, the filtered vehicle acceleration is calculated by the processor 120 of FIG. 1 also using the error in the estimated vehicle reference velocity of step 213, in accordance with the following equation:

Filtered Vehicle Acceleration=(Vehicle Speed Error*Vehicle Acceleration Filter Coefficient/ Loop Time)+Filtered Vehicle Acceleration($n$−1)    (Equation 8).

One or more wheel slip values are determined (step 218). In a preferred embodiment, the at least one wheel slip value is determined in step 218 by the processor 120 of FIG. 1 using the average wheel driven speed of step 202 and the filtered vehicle speed of step 212. Specifically, in accordance with one preferred embodiment, the processor 120 of FIG. 1 calculates the wheel slip for the vehicle using the following equation:

Wheel Slip=(Filtered Vehicle Speed−Average Driven Wheel Speed)/Filtered Vehicle Speed    (Equation 9).

One or more vehicle functions can then be controlled using the wheel slip value (step 218). For example, in one exemplary embodiment, a braking system of the vehicle may control braking and/or adjust braking torque based on the wheel slip value of step 216 (or based on instructions provided thereto by the processor 120 of FIG. 1 using the wheel slip value of step 216). In various other exemplary embodiments, one or more other vehicle control units 102 of FIG. 1 may utilize the wheel slip value of step 216 in controlling and/or adjusting one or more other operational features of the vehicle based on the wheel slip value of step 216 (or based on instructions provided thereto by the processor 120 of FIG. 1 using the wheel slip value of step 216).

In a preferred embodiment, the process 200 then returns to step 202, described above. Steps 202-218 (or an applicable subset thereof, as may be appropriate in certain embodiments) preferably repeat so long as the vehicle is being operated.

Accordingly, improved methods and systems are provided for determining wheel slip of a vehicle. For example, the improved methods and systems provide reliable apparatus and techniques for determining vehicle wheel slip without requiring multiple wheel speed sensors. This may be beneficial, for example, by requiring fewer sensors, by decreasing system size, and/or by facilitating the process of complying with applicable governmental regulations for fuel economy.

It will be appreciated that the disclosed methods and systems may vary from those depicted in the Figures and described herein. For example, as mentioned above, the controller 106 of FIG. 1 may be disposed in whole or in part in any one or more of a number of different vehicle units, devices, and/or systems. In addition, it will be appreciated that certain steps of the process 200 may vary from those depicted in FIGS. 2-5 and/or described herein in connection therewith. It will similarly be appreciated that certain steps of the process 200 may occur simultaneously or in a different order than that depicted in FIGS. 2-5 and/or described herein in connection therewith. It will similarly be appreciated that the disclosed methods and systems may be implemented and/or utilized in connection with any number of different types of automobiles, sedans, sport utility vehicles, trucks, and/or any of a number of other different types of vehicles, and in controlling any one or more of a number of different types of vehicle infotainment systems.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for assessing slippage of wheels in a vehicle, the method comprising the steps of:
   measuring, via a sensor, an initial value of vehicle speed;
   determining, via a processor, at least one of a minimum vehicle speed and a maximum vehicle speed, the minimum vehicle speed comprising a forward-looking estimate of the minimum speed that the vehicle is capable to be able to obtain under current conditions, and the maximum vehicle speed comprising a forward-looking estimate of the maximum speed that the vehicle is capable to be able to obtain under current conditions; and
   determining, via the processor, wheel slip using the initial value and the at least one of the minimum vehicle speed and the maximum vehicle speed.

2. The method of claim 1, wherein the step of measuring the initial value comprises the step of measuring, via a transmission output shaft speed sensor, an average wheel driven speed of the vehicle.

3. The method of claim 1, further comprising the step of:
   calculating, via the processor, an estimated vehicle speed from data from a prior iteration, wherein the step of determining the wheel slip comprises the step of calculating, via the processor, the wheel slip using the initial value, the estimated vehicle speed, and the at least one of the minimum vehicle speed and the maximum vehicle speed.

4. The method of claim 3, further comprising the step of:
   obtaining, via a memory, prior vehicle acceleration and vehicle speed values from the prior iteration, wherein the step of calculating the estimated vehicle speed comprises the step of calculating, via the processor, the estimated vehicle speed using the prior vehicle acceleration and vehicle speed values.

5. The method of claim 3, further comprising the steps of:
   calculating, via the processor, a bounded vehicle speed using the initial value and the at least one of the minimum vehicle speed and the maximum vehicle speed;
   calculating, via the processor, a vehicle speed error using the estimated vehicle speed and the bounded vehicle speed; and
   calculating, via the processor, a filtered vehicle speed using the bounded vehicle speed and the vehicle speed error, wherein the step of determining the wheel slip comprises the step of calculating, via the processor, the wheel slip using the initial value and the filtered vehicle speed.

6. The method of claim 1, wherein:
   the step of determining the at least one of the minimum vehicle speed and the maximum vehicle speed comprises the step of determining, via the processor, the minimum vehicle speed and the maximum vehicle speed; and
   the step of determining the wheel slip comprises the step of calculating, via the processor, the wheel slip using the initial value, the minimum vehicle speed, and the maximum vehicle speed.

7. The method of claim 6, wherein the vehicle has an accelerator pedal and a brake pedal, and the method further comprises the steps of:
   detecting, via a first sensor, a position of the accelerator pedal; and
   detecting, via a second sensor, a position of the brake pedal, wherein:
   the step of determining the maximum vehicle speed comprises the step of determining, via the processor, the maximum vehicle speed using the position of the accelerator pedal; and
   the step of determining the minimum vehicle speed comprises the step of determining, via the processor, the minimum vehicle speed using the position of the brake pedal.

8. The method of claim 6, wherein the vehicle has an engine and a brake system, and the method further comprises the steps of:
   measuring, via a first sensor, an engine torque value; and
   obtaining, via a second sensor, a braking torque value, wherein:
   the step of determining the maximum vehicle speed comprises the step of determining, via the processor, the maximum vehicle speed using the engine torque value; and
   the step of determining the minimum vehicle speed comprises the step of determining, via the processor, the minimum vehicle speed using the braking torque value.

9. A method of assessing slippage of wheels in a vehicle, the method comprising the steps of:
   measuring, via a transmission output shaft speed sensor, an average wheel driven speed of the vehicle;
   determining, via a processor, a minimum vehicle speed and a maximum vehicle speed, the minimum vehicle speed comprising a forward-looking estimate of the minimum speed that the vehicle is capable to be able to obtain under current conditions, and the maximum vehicle speed comprising a forward-looking estimate of the maximum speed that the vehicle is capable to be able to obtain under current conditions;
   calculating, via the processor, a bounded vehicle speed using the average wheel driven speed, the minimum vehicle speed, and the maximum vehicle speed; and
   calculating, via the processor, wheel slip using the average wheel driven speed and the bounded vehicle speed.

10. The method of claim 9, further comprising the steps of:
    calculating, via the processor, an estimated vehicle speed from data from a prior iteration; and
    calculating, via the processor, a vehicle speed error using the estimated vehicle speed and the bounded vehicle speed, wherein the step of determining the wheel slip comprises the step of calculating, via the processor, the wheel slip using the average wheel driven speed and the vehicle speed error.

11. The method of claim 10, further comprising the step of:
    calculating, via the processor, a filtered vehicle speed using the bounded vehicle speed and the vehicle speed error, wherein the step of determining the wheel slip comprises the step of calculating, via the processor, the wheel slip using the average wheel driven speed and the filtered vehicle speed.

12. The method of claim 10, further comprising the steps of:
    obtaining, via a memory, prior vehicle acceleration and vehicle speed values from the prior iteration; and calculating, via the processor, the estimated vehicle speed for a current iteration using the prior vehicle acceleration and vehicle speed values.

13. The method of claim 9, wherein the vehicle has an accelerator pedal and a brake pedal, and the method further comprises the steps of:
   detecting, via a first sensor, a position of the accelerator pedal; and
   detecting, via a second sensor, a position of the brake pedal, wherein:
   the step of determining the maximum vehicle speed comprises the step of determining, via the processor, the maximum vehicle speed using the position of the accelerator pedal; and
   the step of determining the minimum vehicle speed comprises the step of determining, via the processor, the minimum vehicle speed using the position of the brake pedal.

14. The method of claim 9, wherein the vehicle has an engine and a brake system, and the method further comprises the steps of:
   measuring, via a first sensor, an engine torque value; and
   obtaining, via a second sensor, a braking torque value, wherein:
   the step of determining the maximum vehicle speed comprises the step of determining, via the processor, the maximum vehicle speed using the engine torque value; and
   the step of determining the minimum vehicle speed comprises the step of determining, via the processor, the minimum vehicle speed using the braking torque value.

15. A system for assessing slippage of wheels in a vehicle, the system comprising:
   a transmission output shaft speed sensor configured to provide signals pertaining to the wheels of the vehicle; and
   a processor coupled to the transmission output shaft speed sensor and configured to:
   determine an average wheel driven speed of the vehicle using the signals;
   calculate a minimum vehicle speed and a maximum vehicle speed, the minimum vehicle speed comprising a forward-looking estimate of the minimum speed that the vehicle is capable to be able to obtain under current conditions, and the maximum vehicle speed comprising a forward-looking estimate of the maximum speed that the vehicle is capable to be able to obtain under current conditions;
   calculate a bounded vehicle speed using the average wheel driven speed, the minimum vehicle speed, and the maximum vehicle speed; and
   determine wheel slip using the average wheel driven speed and the bounded vehicle speed.

16. The system of claim 15, wherein the processor is further configured to:
   calculate an estimated vehicle speed from data from a prior iteration;
   calculate a vehicle speed error using the estimated vehicle speed and the bounded vehicle speed; and
   determine the wheel slip using the average wheel driven speed and the vehicle speed error.

17. The system of claim 16, wherein the processor is further configured to:
   calculate a filtered vehicle speed using the bounded vehicle speed and the vehicle speed error; and
   determine the wheel slip using the average wheel driven speed and the filtered vehicle speed.

18. The system of claim 16, further comprising:
   a memory configured to store prior vehicle acceleration and vehicle speed values from the prior iteration, wherein the processor is further coupled to the memory and configured to calculate the estimated vehicle speed for a current iteration using the prior vehicle acceleration and vehicle speed values.

19. The system of claim 15, wherein the vehicle has an accelerator pedal and a brake pedal, and the system further comprises:
   an accelerator pedal sensor configured to detect a position of the accelerator pedal; and
   a brake pedal sensor configured to detect a position of the brake pedal, wherein the processor is further coupled to the accelerator pedal sensor and the brake pedal sensor and configured to:
   determine the maximum vehicle speed using the position of the accelerator pedal; and
   determine the minimum vehicle speed using the position of the brake pedal.

20. The system of claim 15, wherein the vehicle has an engine and a brake system, and the system further comprises:
   an engine torque sensor configured to provide an indication of an engine torque of the vehicle; and
   a braking torque sensor configured to provide an indication of a braking torque of the vehicle, wherein the processor is further coupled to the engine torque sensor and the braking torque sensor and configured to:
   determine the maximum vehicle speed using the engine torque; and
   determine the minimum vehicle speed using the braking torque.

* * * * *